Patented May 29, 1934

1,960,348

UNITED STATES PATENT OFFICE 1,960,348

FILTRATION OF ACID SLUDGE

Emmerich v. Pongratz, Mannheim, Germany, assignor to I. G. Farbenindustrie Aktiengesellschaft, Frankfort-on-the-Main, Germany No Drawing. Application July 30, 1932, Serial No. 627,128. In Germany August 27, 1931

6 Claims. (Cl. 23—173)

The present invention relates to improvements in the working up of acid sludges in particular those obtained by refining mineral or tar oils.

In order to recover sulphuric acid from acid sludges derived from the refining of crude liquid hydrocarbon products, such as mineral and tar oils, into sulphuric acid and organic constituents, it has already been proposed to centrifuge the waste acids after dilution with water and if desired in the presence of solid additional substances.

I have now found that a smooth separation of the said acid sludges into mainly tarry and asphaltic constituents, finely divided solid substances and sulphuric acid is effected in an advantageous and very simple manner by subjecting the acid sludges to filtration after dilution with a sufficient amount of water, preferably amounts by weight equal or up to double the acid sludges employed, the said dilution preferably being carried out while cooling to a temperature between about 15° and 30° C. No preliminary heating of the acid sludges effecting a polymerization of the organic substances as in the usual practice is necessary, but the acid sludges may be diluted and filtered just as they are obtained from the refining of the crude liquid hydrocarbon products. In this manner the said tarry and asphaltic constituents and finely divided solid substances are recovered in a form in which they may be made use of for many purposes. The filtration is preferably carried out while subjecting the mass to be filtered to an increased pressure, or while subjecting the filtrate to a decreased pressure. The filtration may take place in the usual suction filters, filter presses, cell filters or pressure filters. Contrary to expectation, a practically complete separation of the mainly tarry and asphaltic constituents and finely divided solid substances contained in the acid sludges is thus obtained without any stoppage of the pores of the filter cloths, including rubber filter cloths, filter plates, filter bricks, taking place. This behaviour of the acid sludges during filtration could in no way be foreseen; on the contrary it was to be expected that the filtration of the waste acids would offer considerable difficulty by reason of the viscous nature of the waste acids and the solid and resinous organic constituents precipitated by the dilution.

In many cases especially when it is desired to obtain relatively pure sulphuric acid it is advantageous to add porous substances, having a large surface area, such as activated carbon, de-ashed brown coal coke, kaolin, bentonite, fuller's earth and other bleaching earths, to the waste acids which have been diluted with water before the filtration. This step is especially recommended in order to obtain sulphuric acid which is as pure as possible.

The process according to the present invention is especially suitable for the treatment of acid sludges obtained as residues in the acid refining of hydrocarbons of low boiling point derived from mineral and tar oils, as for example benzine or benzene. The process may also be advantageously employed for removing the small amounts of solid or semi-solid organic substances still present in sulphuric acid which has already been refined to a certain degree from organic constituents.

The organic products obtainable according to the present invention may be employed as proofing agents for building materials, as for example, concrete or mortar, or they may be worked up by low temperature carbonization or destructive hydrogenation. The sulphuric acid obtained may be employed for the preparation of ammonium salts such as ammonium phosphate or ammonium sulphate after it has been brought to the necessary concentration by evaporation or by the addition of sulphur trioxide or fuming sulphuric acid. If the filtered acid is concentrated to from 94 to 96 per cent strength, it may be used with the same result as fresh sulphuric acid for refining mineral oils, as for example benzine and other crude liquid hydrocarbon products. Any particles of resin formed during the concentration may be removed in a simple manner by filtration, as for example through sand or glass wool. If a darkening of the acid takes place during the evaporation the color may be lightened by treatment with a small amount of an oxidizing agent. For this purpose nitric acid or nitrous gases are especially suitable.

The following examples will further illustrate the nature of this invention but the invention is not restricted to these examples. The parts are by weight.

*Example 1*

100 parts of an acid sludge obtained during the refining of crude benzol with strong or concentrated sulphuric acid are mixed with 130 parts of water while cooling to ordinary temperature. A precipitation of the tarry, asphaltic and finely divided solid substances takes place and these remain for the most part in suspension in the sulphuric acid. The said precipitated substances may be removed practically completely from the dilute sulphuric acid within a short time by subjecting to filtration the mixture of organic substances and sulphuric acid in a filter press lined with lead while employing acid-proof filter cloths. In this manner the dilute acid flows through the filter while the said precipitated substances remain on the filter.

*Example 2*

100 parts of a product which has been obtained from benzine acid sludge by dilution with an equal amount by weight of water, leading in steam, separating and removing the precipitated pitch-like organic constituents and subsequent concentration of the acid still containing organic matter to a percentage of 95 per cent by vaporization of the water in trickling towers by means of combustion gases, are slowly mixed with 100 parts of water and filtered through a suction filter having an acid-proof filter insertion while subjecting the filtrate to reduced pressure. The tarry, asphaltic and finely divided solid constituents remaining on the filter may be employed for rendering building materials waterproof after suitable working up, preferably by deacidifying by means of alkali or alkaline earth lyes, while the dilute sulphuric acid obtained having a pale yellow color may be directly employed without previous concentration for the preparation of fertilizers.

What I claim is:—

1. A process for working up an acid sludge formed by treating a crude liquid hydrocarbon product with sulphuric acid which comprises diluting said sludge, while the same has substantially the original chemical properties, with water and then filtering the diluted sludge.

2. A process for working up an acid sludge formed by treating a crude liquid hydrocarbon product with sulphuric acid which comprises diluting said sludge, while the same has substantially the original chemical properties, with from equal to double its weight of water and then filtering the diluted sludge.

3. A process for working up an acid sludge formed by treating a crude liquid hydrocarbon product with sulphuric acid which comprises diluting said sludge, while the same has substantially the original chemical properties, with water while cooling to a temperature between 15° and 30° C. and then filtering the diluted sludge.

4. A process for working up an acid sludge formed by treating a crude liquid hydrocarbon product with sulphuric acid which comprises diluting said sludge, while the same has substantially the original chemical properties, with water, adding a porous substance having a large surface area to the diluted sludge and then subjecting this sludge to filtration.

5. A process for working up an acid sludge formed by treating crude benzine with sulphuric acid which comprises diluting said sludge, while the same has substantially the original chemical properties, with water and then filtering the diluted sludge.

6. A process for working up an acid sludge formed by treating crude benzene with sulphuric acid which comprises diluting said sludge, while the same has substantially the original chemical properties, with water and then filtering the diluted sludge.

EMMERICH v. PONGRATZ.